(12) United States Patent
Smith

(10) Patent No.: US 6,968,878 B2
(45) Date of Patent: *Nov. 29, 2005

(54) TREE PUSHER

(76) Inventor: Wayne J. Smith, 1064 Noah Trail NW., Brookhaven, MS (US) 39601

( * ) Notice: Subject to any disclaimer, the term of this patent is extended or adjusted under 35 U.S.C. 154(b) by 0 days.

This patent is subject to a terminal disclaimer.

(21) Appl. No.: 10/604,635

(22) Filed: Aug. 6, 2003

(65) Prior Publication Data

US 2004/0103957 A1 Jun. 3, 2004

Related U.S. Application Data

(63) Continuation-in-part of application No. 10/064,161, filed on Jun. 17, 2002, now Pat. No. 6,604,562.

(51) Int. Cl.$^7$ ............................................. A01G 23/08
(52) U.S. Cl. ........................... 144/34.2; 254/1; 254/13; 254/133 R; 144/4.1
(58) Field of Search .................. 144/335, 336, 144/34.1, 34.2, 4.1; 254/133 R, 134, 133 A, 254/1, 11, 13

(56) References Cited

U.S. PATENT DOCUMENTS

| | | | |
|---|---|---|---|
| 1,482,846 A | 2/1924 | Harrah | |
| 2,960,309 A * | 11/1960 | Swanson | 254/133 R |
| 3,548,899 A * | 12/1970 | Emerson | 254/133 R |
| 4,148,462 A | 4/1979 | Jessup | 254/133 R |
| 4,564,173 A | 1/1986 | Atherton et al. | 254/133 R |
| 4,660,806 A | 4/1987 | Masters | 254/11 |
| 5,992,824 A * | 11/1999 | Voss | 254/2 B |
| 6,135,419 A | 10/2000 | Hutson, Jr. et al. | 254/2 R |

* cited by examiner

Primary Examiner—Derris H. Banks
Assistant Examiner—Shelley Self
(74) Attorney, Agent, or Firm—Reginald F. Roberts, Jr.

(57) ABSTRACT

A tree pusher for safely felling a tree. The tree pusher includes (a) a base, (b) a frame, and (c) a detachable pronged head for gripping the tree while the tree is being felled. As the tree falls, the head remains attached to the tree, and detaches itself from the frame of the tree pusher.

13 Claims, 2 Drawing Sheets

TREE PUSHER

CROSS REFERENCE TO RELATED APPLICATIONS

This application is a continuation-in-part of prior application Ser. No. 10/064,161, filed Jun. 17, 2002 now U.S. Pat. No. 6,604,562.

BACKGROUND OF INVENTION

The present invention relates to felling trees. More particularly, the present invention relates to felling trees in a safe and efficient manner by controlling the direction in which the tree falls.

When felling trees, it is a constant problem to determine the direction in which the tree will fall. The problem is especially severe when the tree is leaning in an undesirable direction; e.g., in the direction of a nearby house. When the tree is not leaning in any direction, there is still the problem of preventing the tree from falling on the person or persons who is/are felling the tree. The present invention provides a device and a method for causing the tree to fall in a desired direction.

Attempts have been made to solve these problems, but they have not been successful.

U.S. Pat. No. 4,184,462 to Jessup discloses a tree-felling device adapted to engage a tree being cut down, and to exert a force thereagainst in a particular direction, in order to cause the tree to fall in a selected area. The tree-felling device includes a jacking device of the basic bumper type which is adapted to support an elongated pusher having a tree-engaging head secured at one end thereof, and which is preferably tied to the tree to be cut. As a part of the jacking device, there is provided a ratchet mechanism having an anchoring stud secured thereto for generally receiving and stabilizing one end of said pusher, while the jacking assembly is provided with a support clip about the top portion thereof for holding the pusher.

U.S. Pat. No. 4,564,173 to Atherton et al. discloses an apparatus for pushing a tree over when the tree is being cut down. When a base connected to a bumper jack is placed on a ground surface, the apparatus is tipped at an angle between the ground surface and the tree. A jack handle operates a mechanism to rise along a jack post, causing a support member to push a shaft through an aperture in a guide member until points on a tip member contact the tree, pushing the tree over when the tree is being cut down.

The principal defects of these prior-art inventions are the following:

(a) A bumper jack is not capable of handling the weight of a large tree.

(b) A bumper jack cannot extend its length to a jack post if a longer jack is needed to push the tree over.

(c) The bumper-jack post would bear the entire weight of the tree. If the post should break, the tree could very possibly fall on the person or persons felling the tree, or fall in some other undesirable direction.

(d) In the case of the Jessup patent, the head plate (36) which engages the tree is not embedded in the wood of the tree. If the tree turns or twists, the head plate will move, slip, or become disconnected from the tree.

(e) In the case of the Jessup patent, there is nothing to hold the head plate (36) up while the tree-felling device is placed in position to fell the tree.

(f) In the case of the Jessup patent, once the tree is lying on the ground, it would be difficult to disconnect and remove the chain (38) from the tree trunk.

(g) In the case of the Jessup patent, there is nothing to prevent the pusher (34) from sliding off the head plate (36) when pressure is applied by the jack.

(h) In the case of the Jessup patent, in the event that the tree twists or turns, there is nothing to hold the pusher (34) against the head plate (36).

(i) The bumper jack lifts the load with a ratcheting action that allows for a rocking motion of the tree. This can cause the wood in the hinge point to break.

(j) Bumper jacks have a large number of moving parts, and have springs which may weaken and break.

(k) Under load, the support plate for the jack would flip or rise up in front, causing the plate to skid or to be pushed backwards.

(l) There is nothing to prevent the jack support plate from being pushed into the ground or away from the tree.

(m) Neither tree-felling device is usable on hard surfaces.

(n) There is no effective way of transporting the tree-felling devices to the job site.

The present invention provides an effective solution to these and other problems described along with a detailed description of the invention.

SUMMARY OF INVENTION

In general, the present invention in a first aspect provides a tree pusher for safely felling a tree. The tree pusher comprises (a) a base; (b) a detachable head; and (c) means, mounted on the base, for supporting the detachable head and for urging the detachable head against the tree. The detachable head is constructed and arranged for attachment to the tree while the tree is being felled, and for separation from the rest of the tree pusher and remaining attached to the tree as the tree falls. More specifically, the tree pusher comprises (a) a base; (b) a screw-type propeller trailer jack, pivotally mounted on the base, for urging the tree pusher against the tree; (c) a first tube having first and second ends, the first end of the first tube being connected to the jack; (d) a second tube having first and second ends, the second tube having a smaller cross-sectional area than the first tube, the first end of the second tube being disposed in and fastened to the second end of the first tube; (e) a detachable head, constructed and arranged for engaging the tree, for disposition in the second end of the second tube while the tree is being felled, and for disengagement from the second end of the second tube second tube as the tree falls, the detachable head remaining attached to the tree as the tree falls; and (f) a base for the detachable head, the base for the head being fastened to the second end of the second tube, and providing means for movable disposition of the detachable head in the second tube.

In a second aspect the invention provides a detachable head for engaging a tree that is being felled. The detachable head comprises (a) a rigid elongated member, (b) a plate fastened to one end of the elongated member, and (c) a plurality of prongs fastened to the plate.

DETAILED DESCRIPTION

Figure 1:
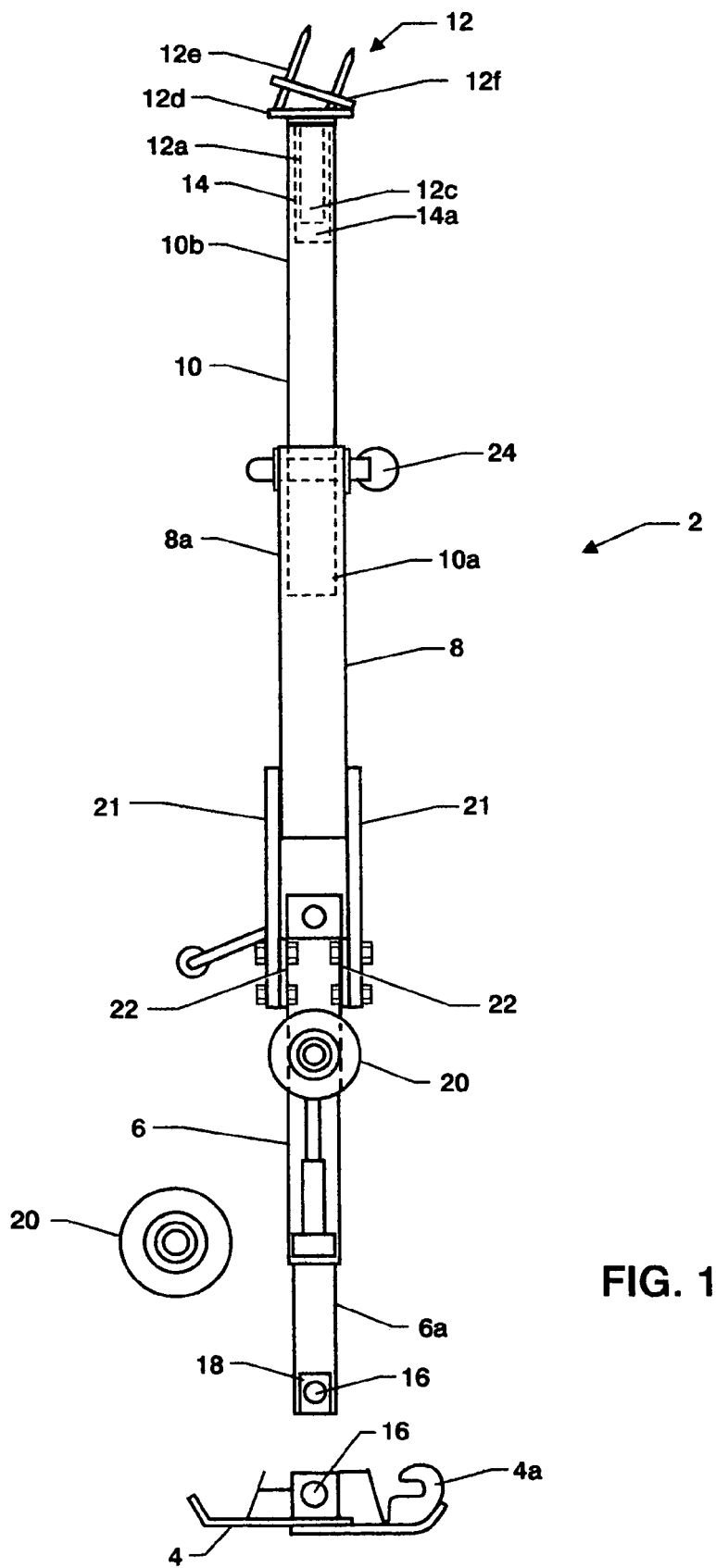
FIG. 1 is an isometric view of a tree pusher, made in accordance with the principles of the present invention.

More specifically, reference is made to FIG. 1, in which is shown a tree pusher made in accordance with the principles of the present invention, and generally designated by the numeral 2.

The tree pusher 2 comprises a base 4, a screw-type propeller jack 6, a first tube 8, a second tube 10, a detachable head 12, and a base 14 for the detachable head 12.

The base 4 includes a hook 4a to engage a chain (not shown) used to secure the tree pusher to a tree being felled. The leg 6a of the jack 6 is pivotally connected to the base 4 by a pin 16, and by a pair of plates 18 which strengthen the area around the pin 16. A wheel 20 is pivotally mounted on the jack leg 6a, and can be readily converted from a position for moving the tree pusher 2 into a stored or retracted position.

The first tube 8 is connected to the jack 6 by two flat pieces 21, and is bolted to the jack 6 by a pair of plates 22 which include openings 22a for bolts (not shown). The plates 22 are welded to the jack 6 and to the flat pieces 21.

The second tube 10 has one end 10a disposed in one end 8a of the first tube 8. The ends 8a and 10a of the first and second tubes 8 and 10 are pinned to one another by a pin 24.

Disposed in the other end 10b of the second tube 10 are the detachable head 12 and the base 14 for the attachable head 12.

The structures of the head 12 and base 14 are more clearly shown in FIGS. 2–5, to which reference is now made.

The detachable head 12 (FIGS. 2 and 3) comprises a tube or bar 12a having first and second ends 12b and 12c. The first end 12b of the tube or bar 12a is fastened to a first plate 12d.

A plurality of prongs 12e are fastened to the first plate 12d. Preferably, a second plate 12f is fastened transversely to the prongs 12e, to brace the prongs 12e. The tube or bar 12a and each prong 12e define therebetween an angle 12g of from about five to about thirty degrees.

Figure 5:
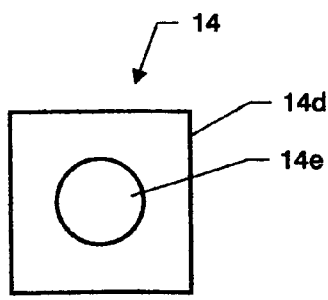
FIG. 5 is a front view of the base for the detachable head shown in FIG. 4.

The base 14 (FIGS. 4 and 5) for the detachable head 12 comprises a tube 14a having first and second ends 14b and 14c, and a third plate 14d fastened to the first end 14b of the third plate 14a. As seen in FIG. 5, the third plate 14d includes an opening 14e.

The detachable head 12 is constructed and arranged so that the bar or tube 12a is disposable in the tube 14a of the base 14 when the bar or tube 12a is inserted through the opening 14e of the third plate 14d. The tube 14a serves as a sleeve, and the third plate 14d as a collar for the bar or tube 12a.

Reference is again made to FIG. 1, in which is shown the head 12 and base 14 for the head 12 disposed in the second tube 10 of the tree pusher 2. The first and second tubes 8 and 10 may be made of square/rectangular or circular/cylindrical tubing; the tube or bar 12a and the tube 14a must be circular/cylindrical, to prevent binding. Likewise, the opening 14e must be circular, in conformity with the tube or bar 12a.

It is critically important that the head 12 remains attached to the tree trunk as the tree falls. For this reason it is critical that the tube or bar 12a, the tube 14a, and the opening 14e be circular/cylindrical, not square or rectangular. A cylindrical tube or bar can freely rotate in the tube 14a and in the opening 14e of the tube 14a as the tree falls; a rectangular tube would bind. Detachability of the head 12 is an extremely important aspect of the present invention, and an extremely important advantage of the invention over the prior art.

Figure 2:
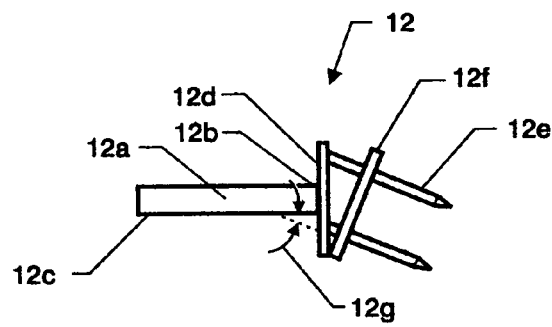
FIG. 2 is a side view of a detachable head for a tree pusher, made in accordance with the principles of the present invention.
Figure 3:
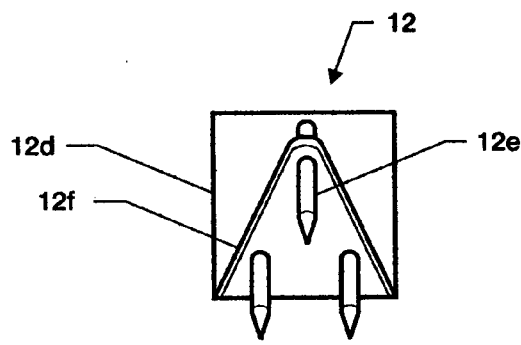
FIG. 3 is a front view of the detachable head shown in FIG. 2.
Figure 4:
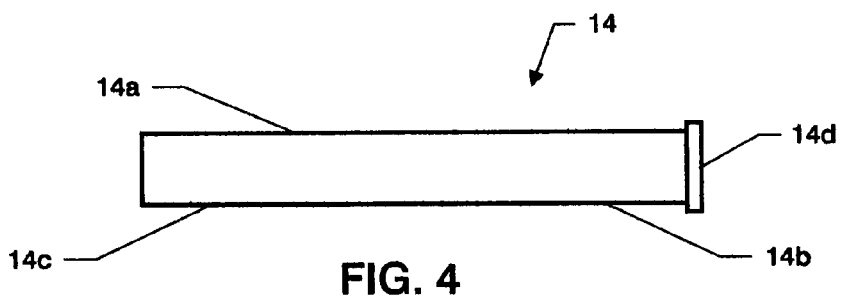
FIG. 4 is a side view of a base for the detachable head shown in FIGS. 2 and 3.

The construction of the detachable head 12 of the tree pusher 2 is critical. In order to attach itself to the tree, the head 12 must embed itself and remain embedded in the wood of the tree. Otherwise, the bark of pine and hardwood trees will break, and the head 12 will come loose and slide off the trunk of the tree. With the head 12 constructed as shown in FIGS. 2 and 3, having prongs 12e which define an angle 12g of from about five to about thirty degrees with the tube or bar 12a, the head 12 will remain in contact with the tree as the tree is pushed over its center of gravity to the point where the tree will fall. The center of gravity of a tree that is leaning e.g. ten degrees, with limbs on the side toward which the tree is leaning, is not in line with the trunk, but is somewhere out on the limbs. A tree with this type of lean has to be pushed far over center before the tree will fall. The angle 12g of the prongs 12e keeps the head 12 in contact with the trunk until and as the tree falls.

For trees that are twisted or crooked, the head 12 must embed and remain embedded in the wood, because the tree will twist or move while being felled. The prongs 12e of the head 12 must remain embedded in the wood, and the head 12 must be able to turn in the tube 14a so as not to lose contact with the tree, or to move the tree pusher 2 during the felling operation. The head 12 cannot be fastened or remain attached to the rest of the tree pusher 2, because if the tree twisted or turned, the head 12 would twist or turn the tree pusher 2, causing loss of control of the tree-pushing operation. As constructed, the pronged head 12 will turn or twist with the movement of the tree, and will not move or twist the tree pusher 2. The head 12 will detach from the remainder of the tree pusher 2 and stay with the falling tree, leaving the rest of the tree pusher 2 safe and unmoved. The head 12 is then removed and recovered from the trunk of the fallen tree, and reused in future operations.

Prior-art tree pushers do not have this important feature. Consequently, either the head will pull out of the tree and remain with the frame of the tree pusher as the tree falls, or the entire tree pusher will be pulled over along with the falling tree. In the former case, control of the operation will be lost; in the latter, a very dangerous situation will be created--a situation which could cause serious injury to personnel and/or major damage to the tree pusher.

While certain embodiments and details have been described to illustrate the present invention, it will be apparent to those skilled in the art that many modifications can be made without departing from the spirit, scope, and basic concept of the invention.

I claim:

1. A tree pusher, comprising:
 a. a base;
 b. a detachable head; and
 c. means, mounted on the base, for supporting the detachable head, for attaching the detachable head to the tree, and for separating the detachable head from the rest of the tree pusher as the tree falls, so that the detachable head remains attached to the tree as the tree falls.

2. A tree pusher, comprising:
 a. a base;
 b. a screw-type propeller jack, pivotally mounted on the base, for urging the tree pusher against the tree;

c. a first tube having first and second ends, the first end of the first tube being connected to the jack;

d. a second tube having first and second ends, the second tube having a smaller cross-sectional-area than the first tube, the first end of the second tube being disposed in and fastened to the second end of the first tube;

e. a detachable head, f. a base for the detachable head, the base for the head including a cylindrical third tube, the detachable head including a cylindrical tube or bar, the base for the head being fastened to the second end of the second tube, and providing means for movable disposition of the cylindrical tube or bar in the cylindrical third tube; and g. means for supporting the detachable head, for urging the detachable head against the tree, for attaching the detachable head to the tree, and for separating the detachable head from the rest of the tree pusher as the tree falls, so that the detachable head remains attached to the tree as the tree falls.

3. The tree pusher of claim 2, wherein the detachable head further includes:

h. a plate fastened perpendicularly to one end of the tube or bar; and i. a plurality of prongs fastened obliquely to the plate, the prongs being constructed and arranged to embed themselves in the wood of a tree being felled.

4. The tree pusher of claim 3, wherein each prong and the tube or bar define therebetween an angle of from about five to about thirty degrees.

5. The tree pusher of claim 1, wherein the detachable head includes:

d. a cylindrical rigid elongated member;

e. a plate fastened perpendicularly to one end of the cylindrical rigid elongated member; and f. a plurality of prongs fastened obliquely to the plate, the prongs being constructed and arranged to embed themselves in the wood of a tree being felled.

6. The tree pusher of claim 5, wherein each prong and the cylindrical rigid elongated member define therebetween an angle of from about five to about thirty degrees.

7. The tree pusher of claim 5, wherein the base for the detachable head includes:

g. a cylindrical tube, for movable disposition therein of the cylindrical rigid elongated member of the detachable head.

8. A tree pusher, comprising:

a. a base;

b. a detachable head;

c. means, mounted on the base, for supporting the detachable head, for urging the detachable head against the tree, for attaching the detachable head to the tree, and for separating the detachable head from the rest of the tree pusher as the tree falls, so that the detachable head remains attached to the tree as the tree falls;

d. a cylindrical rigid elongated member;

e. a plate fastened perpendicularly to one end of the cylindrical rigid elongated member; and f. a plurality of prongs fastened obliquely to the plate, the prongs being constructed and arranged to embed themselves in the wood of a tree being felled.

9. The tree pusher of claim 8, wherein the base for the detachable head includes:

g. a cylindrical tube, for movable disposition therein of the cylindrical rigid elongated member of the detachable head.

10. The tree pusher of claim 1, wherein the means for urging the detachable head against the tree include a screw-type propeller trailer jack, pivotally mounted on the base.

11. The tree pusher of claim 1, wherein the means for separating the detachable head from the rest of the tree pusher include:

d. a cylindrical rigid elongated member;

e. a plate fastened perpendicularly to one end of the cylindrical rigid elongated member;

f. a plurality of prongs fastened obliquely to the plate, the prongs being constructed and arranged to embed themselves in the wood of the tree being felled; and g. a cylindrical tube, for movable disposition therein of the cylindrical rigid elongated member of the detachable head.

12. The tree pusher of claim 10, wherein each prong and the cylindrical rigid elongated member define therebetween an angle of from about five to about thirty degrees.

13. The tree pusher of claim 12, wherein each prong and the cylindrical rigid elongated member define therebetween an angle of from about five to about thirty degrees.

* * * * *